United States Patent [19]

Lagadec

[11] Patent Number: 4,942,565
[45] Date of Patent: Jul. 17, 1990

[54] APPARATUS FOR RECORDING A WOBBLING, SPIRAL GUIDE GROOVE ON AN OPTICAL DISC

[75] Inventor: Roger Lagadec, Kanagawa, Japan

[73] Assignee: Sony Corporation, Tokyo, Japan

[21] Appl. No.: 387,425

[22] Filed: Jul. 28, 1989

Related U.S. Application Data

[63] Continuation of Ser. No. 102,009, Sep. 28, 1987, abandoned.

[30] Foreign Application Priority Data

Sep. 30, 1986 [JP] Japan ................................ 61-232741

[51] Int. Cl.⁵ .............................................. G11B 1/24
[52] U.S. Cl. .................................................... 369/59
[58] Field of Search ............... 360/20; 369/32, 44–47, 369/59, 93–95, 102, 108, 109, 111, 275, 277–279

[56] References Cited

U.S. PATENT DOCUMENTS

| | | | |
|---|---|---|---|
| 3,591,731 | 7/1971 | Stancil | 360/20 |
| 3,931,460 | 1/1976 | Watson | 369/44 |
| 3,946,367 | 3/1976 | Wohlmut et al. | 369/59 |
| 3,963,862 | 6/1976 | Bouwhuis . | |
| 4,025,731 | 5/1977 | Rembault | 369/102 |
| 4,067,044 | 1/1978 | Maeda et al. | 369/32 |
| 4,085,423 | 4/1978 | Tsunoda et al. | 369/108 |
| 4,090,031 | 5/1978 | Russell | 369/108 |
| 4,188,433 | 2/1980 | Dijkstra et al. | 369/275 |
| 4,194,222 | 3/1980 | Ebbinga | 360/20 |
| 4,223,347 | 9/1980 | Bouwhuis et al. | 369/44 |
| 4,375,088 | 2/1983 | de Haan et al. | 369/111 |
| 4,375,096 | 2/1983 | Gorog et al. | 369/102 |
| 4,392,219 | 7/1983 | Yokozawa et al. | 369/277 |
| 4,716,560 | 12/1987 | Itonaga | 369/275 |
| 4,740,938 | 4/1988 | Bierhoff et al. | 369/32 |

FOREIGN PATENT DOCUMENTS

| | | |
|---|---|---|
| 0285984 | 5/1987 | European Pat. Off. . |
| 2550872 | 5/1976 | Fed. Rep. of Germany ...... 369/108 |
| 77933 | 6/1981 | Japan .................................. 369/108 |

OTHER PUBLICATIONS

Patent Abstract of Japan, vol. 9, No. 199, Published Aug. 16, 1985.
Patent Abstract of Japan, vol. 7, No. 234, Published Oct. 18, 1983.

Primary Examiner—Vincent P. Canney
Attorney, Agent, or Firm—Lewis H. Eslinger; Jay H. Maioli

[57] ABSTRACT

Recording apparatus for forming a track on a disk-shaped recording medium capable of optical information reproduction, comprises a deflection device for deviating a recording beam from a light source in a radial direction of the disk-shape recording medium and a deflection-control signal generating device. The deflection control signal is developed from the superimposition of a first signal having a predetermined frequency and a second signal having a lower frequency than the predetermined frequency. The superimposition of the second signal can be done while retaining the predetermined frequency.

6 Claims, 7 Drawing Sheets

APPARATUS FOR RECORDING A WOBBLING, SPIRAL GUIDE GROOVE ON AN OPTICAL DISC

This is a continuation of application Ser. No. 102,009, filed Sep. 28, 1987, now abandoned.

BACKGROUND OF THE INVENTION

1. Field of the Invention

This invention relates to a recording apparatus for forming a track onto an optical disk and a recording method for forming the same and, more particularly, to an apparatus for recording an absolute time code, for instance, as a pregroove in the case of pregroove formation.

2. Description of the Prior Art

As a tracking error detection system for optical disk reproduction, a three-spot system, a push-pull system, a wobbling system, etc. have been proposed. The three-spot system maintains a relationship in which two sub-beam spots are positioned on both sides of a track and a main beam spot is positioned at the center of the track. Reflection light from the two subbeams is led to a pair of optical sensors arranged on both sides of a main sensor so that a tracking error can be detected from a difference output of the pair of optical sensors. In the push pull system, a beam is irradiated at the center of the track, light reflected therefrom is detected at a two-division optical sensor, and a difference output of two optical sensor elements due to deviation of diffracted light is detected as a tracking error. For the wobbling system, there are a system for detecting a tracking error from an output of coherent detection of a reproduced signal and a signal for oscillating a reproduced beam by giving a meander to the reproduced beam and a system for wobbling the track side at a predetermined frequency. The wobbling is done by a sinewave signal of 22.05 [kHz], for instance.

Further, as a rotation system of an optical disk, there are a CAV (constant angular velocity system) and a CLV (constant linear velocity system). The CLV can improve the density of data recording as compared with the CAV, while a CLV servo for controlling the rotation speed depending on the position in the radial direction of the optical disk is needed. The position in the radial direction of the disk is detected by a position detector such as a potentiometer cooperating with an optical head.

Figure 12A:
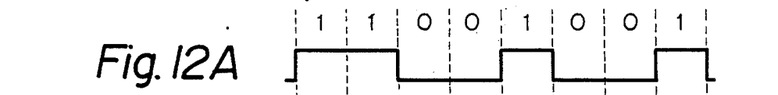
FIGS. 12A and B are a waveform diagram for explaining conventional PSK modulation.
Figure 12B:
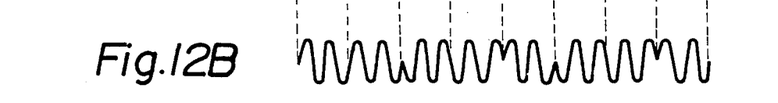

For the detection of the position of the optical head, the use of a position detector such as a potentiometer results in a cost increase and does not necessarily attain correct position detection. It is desirable that the position of the optical head on the optical disk can be detected from a reproduced signal without separately providing the position detector. As one method for this approach, it is conceivable to record a time code. However, the recording of the time code in a data track itself tends to decrease the amount of data that can be recorded on a single disk. Also, in the case where the recording is made by the modulation of the time code, the use of a PSK modulation can be considered. The PSK modulation develops a modulated signal shown at B of FIG. 12 and having phases corresponding to "1" and "0" respectively of data shown at A of FIG. 12. However, there is a disadvantage that the phases of the modulated signal become discontinuous.

SUMMARY OF THE INVENTION

An object of the invention is, therefore, to provide a recording apparatus and a recording method capable of providing position information by applying a signal containing another information signal such as a time code as a deflection control signal for forming a wobbling track for tracking error detection without employing any position detector and increasing data redundancy.

In this invention, in a recording apparatus for forming a track of a disk-shape recording medium capable of optical information reproduction, the recording apparatus comprises a deflection device for deviating a recording beam from a light source in a radial direction of said disk-shape recording medium; and a deflection-control signal generating device. The deflection control signal is a combined signal composed of the superimposition of a first signal having a predetermined frequency and a second signal having a lower frequency than said predetermined frequency. More specifically, the first signal is a wobbling signal, the second signal is absolute time information, and the track is a pregroove.

A combination signal, which is the superimposition of the first signal and the second signal, is used as a deflection control signal. The first signal is employed for the detection of tracking error. For example, the signal is a signal of 22.05 [kHz]. The second signal is an absolute time code of a CD format varying at a lower frequency, for instance, at 75 [Hz] rather than 22.05 [kHz]. Since the frequency of the second signal is very low as compared with the first signal, the deflection control signal has a predetermined frequency of the first signal as a whole even if the second signal is superimposed. As a result, when a disk-shape recording medium is reproduced, a signal of a predetermined frequency component can be separated, and the second signal can be taken out from the signal of the predetermined frequency component. In this way, since the deflection control signal has information on the absolute time code, the position of a head on the disk-shape recording medium can be detected.

BRIEF DESCRIPTION OF THE DRAWINGS

The invention will become more apparent from the following detailed description when taken in conjunction with the drawings in which:

FIGS. 3A through K are a time chart for describing the operation of the modulation circuit;

DESCRIPTION OF THE PREFERRED EMBODIMENT

An embodiment of the invention will be described hereunder. This description will be given in the order mentioned below.
a. Time code and modulation rule
b. Modulation circuit
c. Formation of pregroove
d. Wobbling signal generator
e. Disk recording/reproducing circuit
f. Modification a. Time code and modulation rule In this embodiment, when a spiral pregroove is provided in an optical disk by wobbling to carry out a tracking operation, a time code is recorded in the pregroove itself. For the time information, an absolute time code as adopted in CDs (compact disks) is employed. The absolute time code is in one-to-one correspondence to a scanning position of a head (pickup) of the optical disk and gives not only information of a disk diameter at the time of rotating the optical disk by a CLV (constant linear velocity) system but also address information at the time of data access.

In the CD, a signal of 588 bits is recorded as a frame in channel bits, and a frame frequency at a predetermined linear velocity is 7.35 [kHz]. In the CD, spaces (user's bits or subcodes) are provided for recording information other than a music signal. The subcode is made up of eight independent bits (called "PQRSTUVW"), and two channels of P and Q are presently employed. Said eight independent bits are inserted into one frame by EFM modulation. Each channel of the subcode is composed of 98 bits contained in 98 frames, respectively, of one block.

In the music signal and data of the channel Q of a read-out track, an absolute time code "AMIN", "ASEC", and "AFRAME" is inserted. The absolute time code is brought to ⌈00 minute 00 second 00 frame⌋ and varies depending on the running time of the disk, and it is assumed that (one second=75 frames) is established in the CD based on the above-mentioned frame frequency.

Each of the minute, second and frame of the absolute time code can be represented by two digits of the BCD code. In other words, the minute and second vary between (00~59), and the frame changes between (0~74) using a total of six characters of the BCD code.

EFM (Eight to Fourteen Modulation) for channel coding converts a signal of 8 bits per symbol into a 14-bit signal according to a predetermined rule. With the EFM, the occupied frequency band becomes narrow, and clock components increase to reduce direct current components.

On the other hand, in a tracking system for wobbling a pregroove, a 22.05 [kHz] sinewave is employed. For this reason, in the case of recording the absolute time code of the CD format as a wobbled pregroove, it is necessary to reproduce the sinewave signal of the above-mentioned frequency with a stable phase. In this one embodiment, the modulation of the absolute time code is made on the basis of a sampling frequency of (22.05×2=44.1 [kHz]).

Figure 4A:
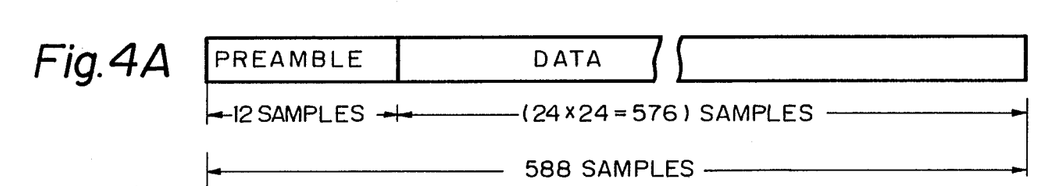
FIGS. 4A and B and 5A and B are waveform diagrams for describing a modulation rule and a modulation method.

Since the frequency of change in the absolute time code is 75 [Hz], 588 samples are contained in one period in the case of a 44.1 [kHz] sampling frequency. A predetermined number of samples, for example, 24 samples (2×12 modulation bits) are allotted for one bit of absolute time code data of six BCD characters (a total of 24 bits), each of which has four bits. As shown at A of FIG. 4, a preamble having a 12-sample length is added at the head of the 588 samples (=1/75 second) and data of (24×24=576) samples follow thereafter.

Figure 4B:
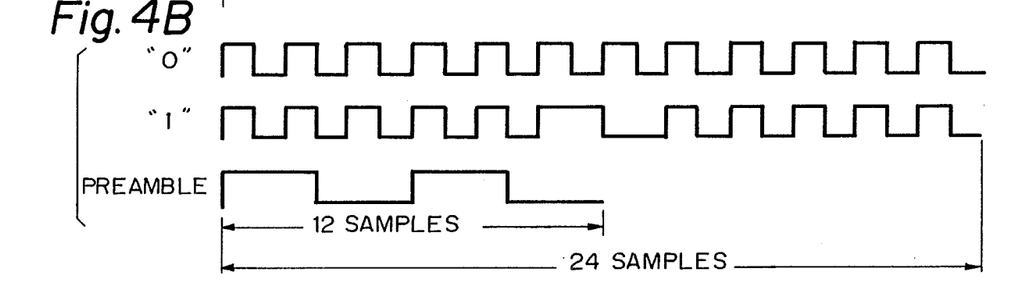

"0" and "1" of one data bit and the preamble are modulated, respectively as shown at B of FIG. 4. The data bits "0" are modulated into a sequence ("0" sequence) in which 24 samples take a high level and a low level alternately. For the data bits "1", the 12-th sample of the 24 samples has a high level changed from a low level, the 13-th sample has a low level changed from a high level, and the other samples are modulated into a sequence ("1" sequence) similar to the data bits "0". Also, the preamble is made to a pattern having a high level and a low level alternately every three samples. The data bits "0" are modulated into a DC-free sequence This sequence has a repetition frequency of 21.05 [kHz] and contains a sinewave component for tracking control. The "1" sequence corresponding to the data bits "1" is a DC-free sequence similarly and its run length is limited to two samples. The "0" sequence corresponding to the data bits "0" is desirable as compared with the "1" sequence in terms of the sinewave component for tracking control. With respect to the absolute time code, the "0" sequence is a more desirable pattern than the "1" sequence, since the length of "0" continuation is long as compared with "1". The sequence corresponding to the preamble is DC-free and is generated once every (1/75) second.

Figure 5A:
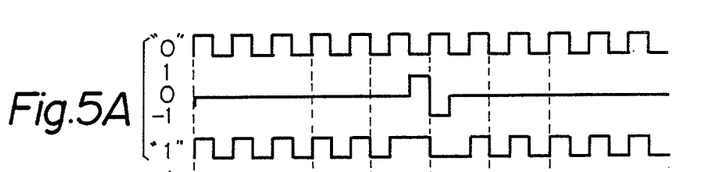
Figure 5B:
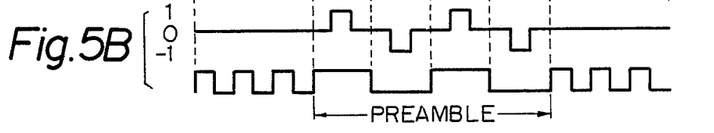

A method for actually producing the "1" sequence and the preamble sequence will be described with reference to FIG. 5. 24 samples of the "1" sequence are developed by the addition of a ternary signal, which is (+1) at the 12-th sample and (−1) at the 13-th sample to the "0" sequence as shown at A of FIG. 5. A 12-sample sequence corresponding to the preamble is developed by the addition of a signal, which is (+1) at the 8-th sample and the 14-th sample, respectively and (−1) at the 11-th sample and the 17-th sample, respectively, to the "0" sequence as shown at B of FIG. 5.

b. Modulation circuit

Figure 1:
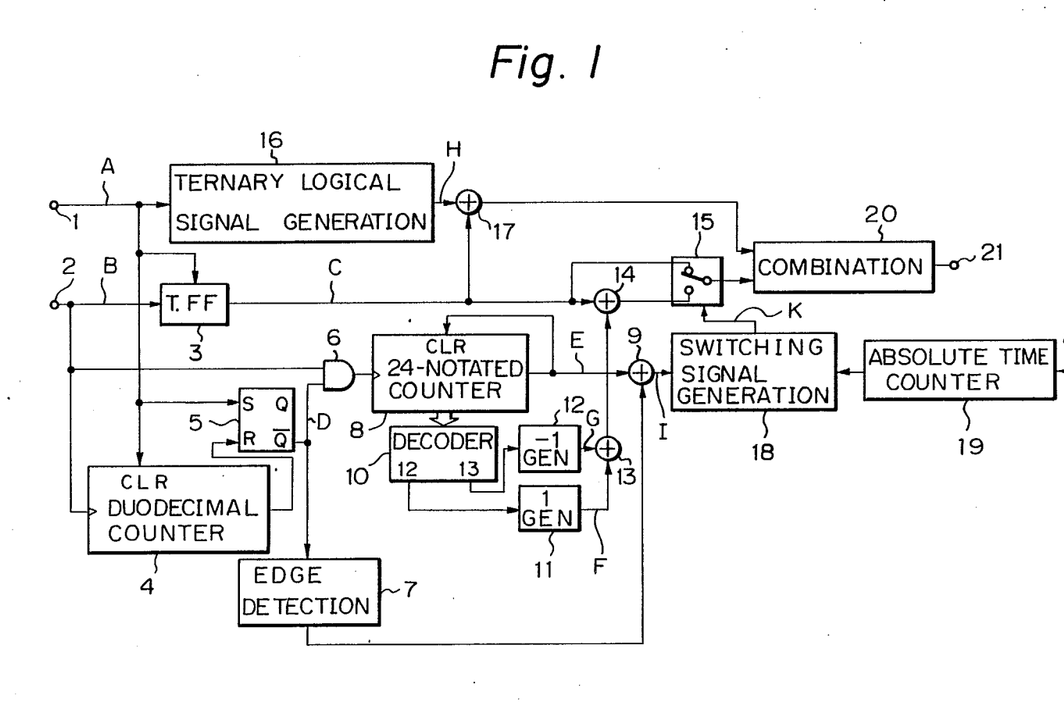
FIG. 1 is a block diagram of a modulation circuit for modulating an absolute time code into a pulse sequence.

As described above, one example of the modulation circuit, which modulates "0" or "1" of data bits into a 24-sample sequence of a predetermined pattern, is shown in FIG. 1.

In FIG. 1, 1 is an input terminal to which a frame pulse A of a frame frequency 75 [Hz] is given. 2 is an input terminal to which a clock pulse B of 44.1 [kHz] is given. The period of the clock pulse B is indicated by T. A and B of FIG. 3 show the frame pulse A and the clock pulse B, respectively. The clock pulse B is used as inputs of a T flip-flop 3 and a duodecimal counter 4. A "0" sequence C with the period 2T shown at C of FIG. 3 is generated from the T flip-flop 3. To the T flip-flop 3 and the duodecimal counter 4 is supplied the frame pulse A as a clear input.

Figures 3A, 3B:
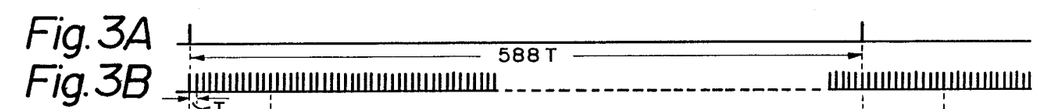
Figure 3C:
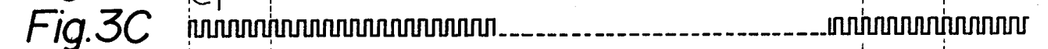
Figure 3D:
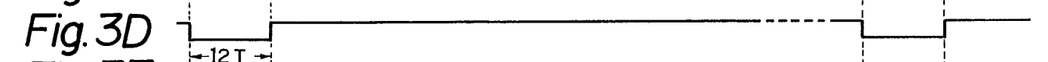

The frame pulse A is supplied as a set input of the SR flip-flop 5, and as its reset input the carry output of the duodecimal counter 4 is given. For this reason, a pulse signal D, which takes a low level for a period from the frame pulse A to 12T, is produced at an output terminal Q of the SR flip-flop 5 as shown at D of FIG. 3. The pulse signal D is supplied to an AND gate 6 and an edge detector 7. The clock pulse B is given to the AND gate 6 and to the 24-notated counter 8 via the AND gate 6.

The 24-notated counter 8 is cleared by a carry output E of the 24-notated counter 8, and the carry output E is given to an adder 9.

The carry output E of the 24-notated counter 8 is generated every 24T after the pulse signal D takes a high level as shown at E of FIG. 3. Also, a pulse signal, which is in synchronism with a leading edge of the pulse signal D, is produced from the edge detector 7 and supplied to the adder 9. A pulse signal I from the adder 9 is generated every 24T after the 12T-period of the preamble as shown at I of FIG. 3.

Figures 3E, 3F:
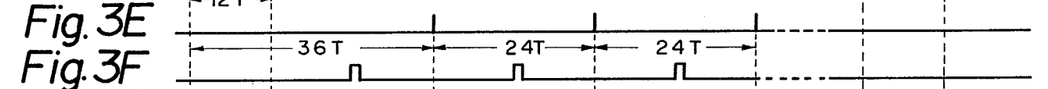
Figure 3G:
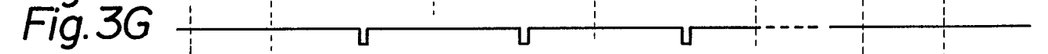

The parallel output data of the 24-notated counter 8 is supplied to a decoder 10. The output signal of the decoder 10 produced when the content of the 24-notated counter 8 is 12, is given to a (1) generator 11, while the output signal of the decoder 10 produced when the content of the 24-notated counter 8 is 13, is given to a (−1) generator 12. As a result, as shown at F of FIG. 3, a pulse signal F with a "1" level is generated from the (1) generator 11, whereas a pulse signal G with a (−1) level is generated from the (−1) generator 12 as shown at G of FIG. 3. These pulse signals F and G are added up at an adder 13. The output signal of the adder 13 is given to an adder 14. Since the "0" sequence C from the T flip-flop 3 is supplied to the adder 14, the output signal of the adder 14 becomes a "1" sequence.

Figure 3H:
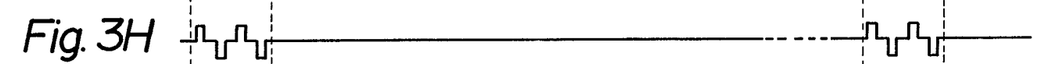
Figure 3I:
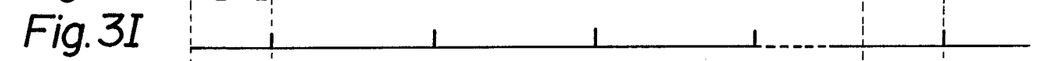

These "0" sequence and "1" sequence are supplied to two input terminals of a switch circuit 15, respectively. The switch circuit 15 is controlled by a switch signal K from a switch signal generator 18, and data from the switch circuit 15 is supplied to a combination circuit 20. The combination circuit 20 adds a preamble of 12 samples every 588 samples. The preamble is developed by a ternary logical signal generator 16 and an adder 17. The ternary logical signal generator 16 generates a ternary pulse signal H of (0100–100100–10) in synchronism with the frame pulse A as shown at H of FIG. 3. The pulse signal H and the "0" sequence C are given to the adder 17, and the preamble is produced from the adder 17. A modulated sequence is obtained at an output terminal 21 of the combination circuit 20.

Figure 2:
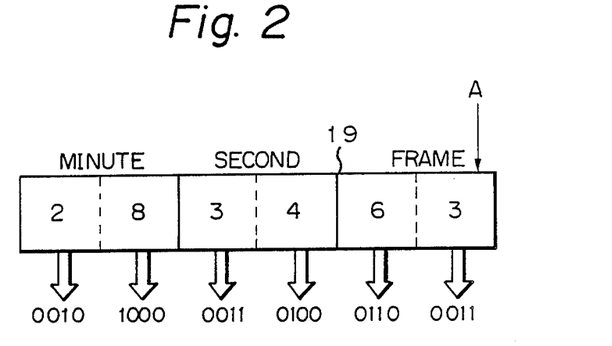
FIG. 2 is a block diagram of a counter for generating the absolute time code.
Figure 3J:
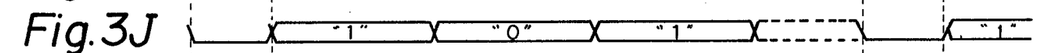
Figure 3K:
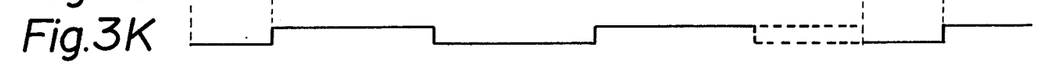

19 is an absolute time counter for producing an absolute time code of a CD format on the basis of the frame pulse A. FIG. 2 shows a construction of the absolute time counter 19, and each of the frame, second and minute is made up of two BCD. FIG. 2 illustrates the example of 28 minutes 34 seconds 63 frames. In this case, six B⌈(0010) (1000) (0011) (0100) (0110) (0011)⌉ are generated. The absolute time code from the absolute time counter 19 is sent to the switching signal generator 18. Each data bit of the absolute time code is taken into the switching signal generator 18 in synchronism with a pulse signal I as shown at J of FIG. 3. A switching signal K (K of FIG. 3), which takes a high level in response to a data bit "1" and a low level in response to a data bit "0", is developed. By the low level of the switching signal K, the "0" sequence is selected by the switch circuit 15, while the "1" sequence is selected by the switch circuit 15 with the high level of the switching signal K.

c. Formation of pregroove

Figure 6:
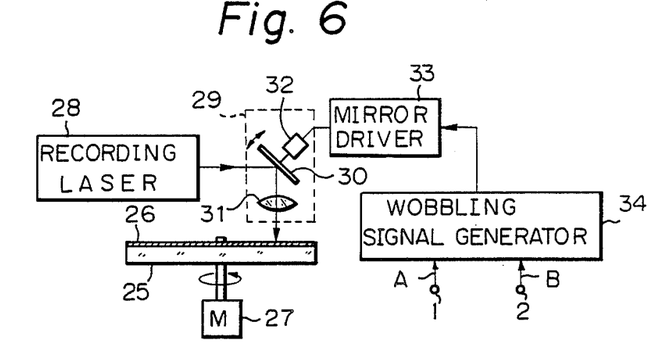
FIG. 6 is a schematic diagram for showing a structure of a cutting system.

A cutting system for forming a pregroove on an optical disk is shown in FIG. 6. In FIG. 6, 25 shows a glass disk, and a photoresist 26 is coated on the glass disk 25. The glass disk 25 is rotated by a spindle motor 27 at CLV. 28 is a recording laser, for instance, an argon-ion laser. A laser beam from the recording laser 28 is reflected from a galvanomirror 30 of an optical head 29 circled by a broken line and irradiated into the photoresist 26 through an object lens 31. The rotation of the galvanomirror 30 by a galvanomotor 32 wobbles the laser beam in the diameter direction.

A drive signal from a mirror driver 33 is given to the galvanometer 32. To the mirror driver is supplied a wobbling signal from a wobbling signal generator 34. The wobbling generator 34 is composed of the above-mentioned modulation circuit and a filter for band restriction. A spiral and wobbled pregroove is exposed onto the photoresist 26 by the laser beam.

Figure 7:
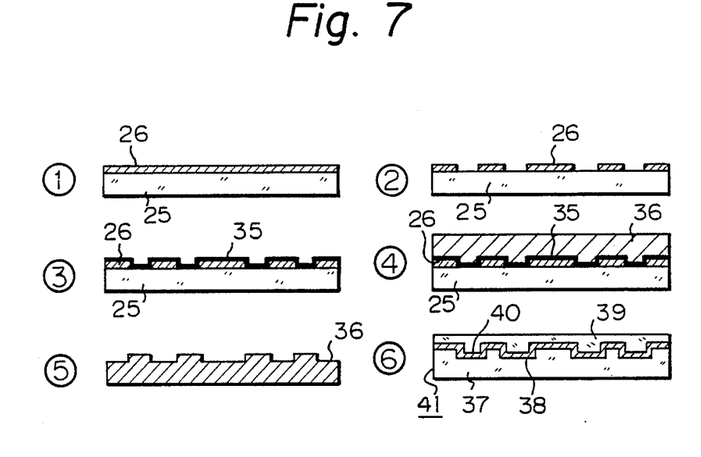
FIGS. 7 and 8 are schematic diagrams for showing an example of a manufacturing method of an optical disk and for showing a pregroove.

In FIG. 7, ① shows a glass master optically cut, and a concave portion corresponding to the pregroove is formed onto the photoresist 26 through development as shown by ②. An aluminum film 35 is then vapor-deposited on the photoresist 26 (③). Further, nickel plating 36 is applied (④), and a metal master is formed by removing the nickel plating 36 (⑤). A stamper is made by the metal master. An optical disk 41 is made through steps of the injection molding by the stamper, the formation of a recording layer and the addition of a protective film ⑥). The optical disk 41 has a polycarbonate substrate 37, a recording layer 38, and a transparent protective film 39, and a pregroove 40 is formed on the recording layer 38. The optical disk 41 may have a pasted structure to enable the recording of both surfaces.

Figure 8:
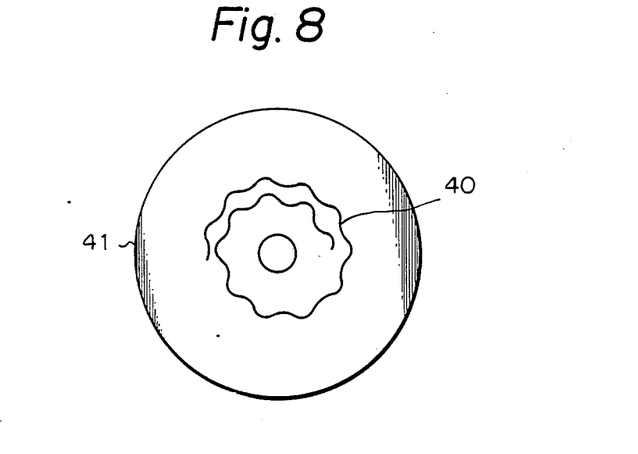

The recording layer 38 is composed of a material of SbSe, BiTe, etc., in the case of a WORM optical disk, while in the case of an erasable optical disk, for instance, in the case of an optical magnetic disk, it is made up of a material such as TbFeCo. Also, the present invention can be applied to a phase change type optical disk utilizing a crystal-amorphism phase change. The pregroove 40 is made to a U groove or a V groove, and pits are formed on the pregroove 40 or in a region between the pregrooves. FIG. 8 shows a part of the pregroove 40 formed on the optical disk 41. The diameter of the optical disk 41 is the same as that of the CD.

d. Wobbling signal generator

Figure 9:
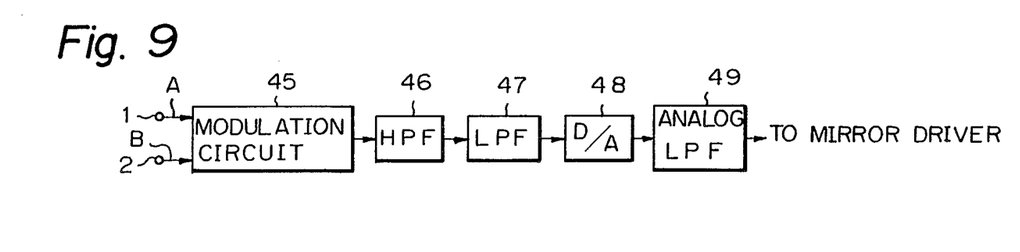
FIG. 9 is a block diagram of one example of a wobbling signal generator.

FIG. 9 shows the wobbling signal generator, and 45 is the above-mentioned modulation circuit shown in FIG. 1. A pulse sequence modulated with an absolute time code of the CD format is generated from the modulation circuit 45. The pulse sequence basically has a repetition frequency of 22.05 [kHz] and is subjected to band restriction by passing through a filter. The band restriction toward the low pass is necessary for suppressing the disturbance related to a tracking error signal, while the band restriction toward the high pass is needed to suppress the disturbance related to an EFM modulation signal (reproduced data).

Figure 10:
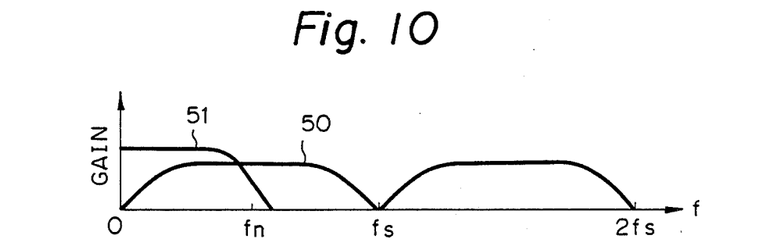
FIG. 10 is a diagram of a frequency spectrum for describing the band restriction in the wobbling signal generator.

A digital high-pass filter 46 connected to the modulation circuit 45 is provided for carrying out the band restriction with respect to the low pass and has a frequency characteristic shown at 50 in FIG. 10. In FIG. 10, $f_n$ denotes 22.05 [kHz], and $f_s$ depicts 44.1 [kHz], respectively.

The output signal of the digital high-pass filter 46 is supplied to a digital low-pass filter 47. The digital low-pass filter 47 has a frequency characteristic shown at 51 in FIG. 10. For the digital low-pass filter 47, a structure using over-sampling is employed The output signal of the digital low-pass filter 47 is given to a D/A converter 48. The D/A converter 48 converts the high level and the low level of a pulse signal into respective direct current voltages with adequate values. The output signal of the D/A converter 48 is supplied to an analog low-pass filter 49. A wobbling signal is generated from the analog low-pass filter 49. The wobbling signal is given to the mirror driver 33 (refer to FIG. 6).

e. Disk recording/reproducing circuit

Figure 11:
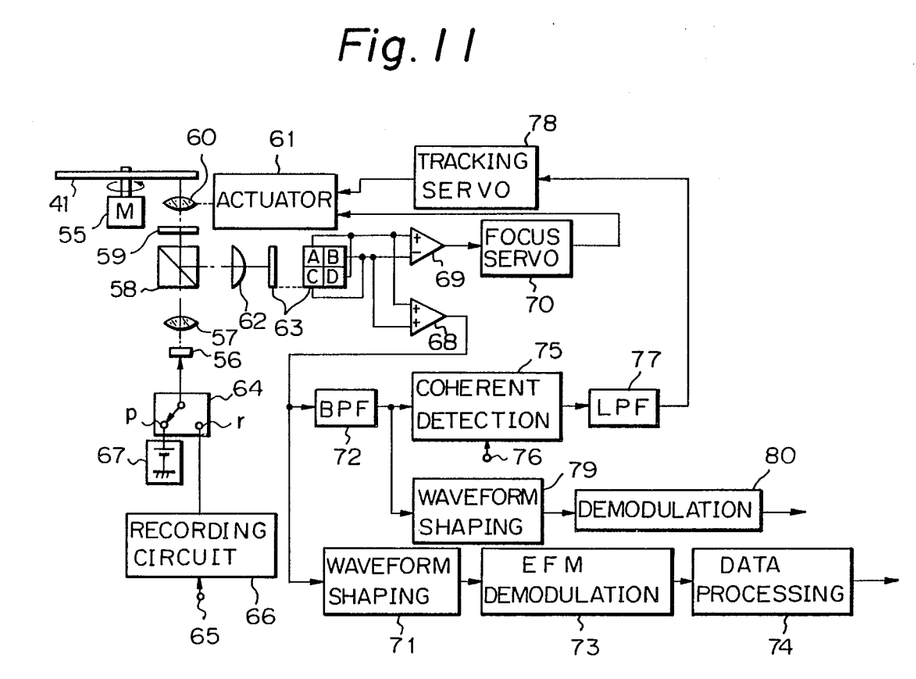
FIG. 11 is a block diagram of an example of a recording/reproducing circuit of an optical disk.

FIG. 11 shows an example of the disk recording/reproducing circuit The optical disk 41 of the same size as CD is rotated at CLV by a spindle motor 55. Although various kinds of structures for an optical head have been known, an optical head in which both a focus adjustment unit and a tracking control unit are incorporated, is employed in this example.

The optical head is composed of a semiconductor laser 56, a collimating lens 57, a beam splitter 58, a ¼ wave plate 59, an object lens 60, an actuator 61 consisting of a coil and a magnet for moving the object lens 60, and an optical sensor 63 given a laser beam from the beam splitter 58 through a cylindrical lens 62. A drive signal is supplied to the semiconductor laser 56 through a recording/reproduction switching switch 64.

Recording data from a terminal 65 is given to a recording circuit 66. A recording signal from the recording circuit 66 is fed to the semiconductor laser 56 via a terminal r on the recording side of the recording/reproduction switching switch 64. A circuit for adding a redundancy code of an error correction code, an EFM modulation circuit, a recording timing controller, etc. are provided at the recording circuit 66. At the time of reproduction of the optical disk 41, a predetermined direct current 67 is given to the semiconductor laser 56 through a terminal p on the reproduction side of the recording/reproduction switching switch 64.

A returning beam from the optical disk 41 is irradiated into the optical sensor 63 through the beam splitter 58 and the cylindrical lens 62. The optical sensor 63 has a detector construction of four divisions. Assuming that the output signals of each sensor of the optical sensor 63 are A, B, C and D, a main reproduction signal represented by [(A+B)+(C+D)] is developed by an adder 68, and a focus error signal represented by [(A+B)−(C+D)] is developed by a subtractor 69. The focus error signal is supplied to a focus servo circuit 70, and a control signal for focus servo is given to the actuator 61.

The main reproduction signal from the adder 68 is fed to a waveform-shaping circuit 71 and a band-pass filter 72. In the waveform-shaping circuit 71, the reproduction signal is converted into a pulse signal, and the pulse signal is given to an EMF demodulation circuit 73. A reproduction signal from the EMF demodulation circuit 73 is supplied to a data processing circuit 74. Reproduction data from the data processing circuit 74 is given to an optical disk control circuit provided between an optical disk drive unit and a computer.

The band-pass filter 72 has a pass band of (22.05 [kHz]±900 [Hz]) to separate a component of a reproduction signal corresponding to the pregroove. The output signal of the band-pass filter 72 is supplied to a coherent detector 75 and a wave-shaping circuit 79. A sinewave signal of 22.05 [kHz] is given from a terminal 76 to the coherent detector 75. The output signal of the coherent detector 75 is fed to a low-pass filter 77. A tracking error signal is taken out of the low-pass filter 77. The tracking error signal is supplied to a tracking servo circuit 78, and a tracking control signal is given to the actuator 61 from the tracking servo circuit 78.

A pulse sequence modulated with the absolute time code of the CD format is obtained by a waveform-shaping circuit 79. The pulse sequence is supplied to a demodulation circuit 80. In the demodulation circuit 80, the pulse sequence is demodulated into data bits of the absolute time code. The absolute time code given from the demodulation circuit 80 is supplied to a system controller (not shown) of the optical disk drive unit and used for control etc. of a CLV servo of the spindle motor 55 and a scanning position of the optical head at the time of the seek operation.

f. Modification

The invention is not limited to the case of the recording through the modulation of the time code of the CD format and can be applied to those cases of the recording through the modulation of a time code such as other SMPTE and digital data other than the time code.

In addition, in the invention, information such as the time code can be superimposed on a signal other than the signal of a pregroove of the optical disk.

The present invention allows the superimposition of other information such as the time code on a deflection control signal for developing a wobbling track for detection of a tracking error. As a result, the time code, etc. can be recorded without increasing the redundancy of a data track.

Although the invention has been described by way of one embodiment, various alternatives and modifications thereto can readily be made within the scope of the invention defined by the appended claims.

What is claimed is:

1. Apparatus for forming a wobbling, substantially spiral pregroove on a disc-shaped recording medium for use as a tracking guide when subsequently recording data on the recording medium, said apparatus comprising:

means for rotating said disc-shaped recording medium;

a laser beam source for generating a laser beam;

means for moving said laser light beam source radially relative to said disc-shaped recording medium;

optical means for guiding said laser beam to said disc-shaped recording medium, said optical means including deflecting means for deflecting said laser beam in a radial direction of said disc-shaped recording medium in response to a modulated control signal while said disc-shaped recording medium rotates and said laser light beam source moves radially relative to said recording medium, whereby a wobbling, substantially spiral tracking guide pregroove is formed on said disc-shaped recording medium; and control signal generating means connected to receive a first signal that has a first predetermined frequency and to receive a coded information second signal that has a second predetermined frequency at least an order of magnitude lower than said first predetermined frequency, said modulated control signal being generated by superimposing said second signal on said first signal, said modulated control signal being fed to said deflecting means for causing said laser light beam to wobble as the substantially spiral pregroove is formed on said recording medium in accordance with said modulated control signal.

2. Apparatus according to claim 1, wherein said second signal is an absolute time code signal having minutes information, seconds information and frames information in binary coded decimal form.

3. Apparatus according to claim 2, wherein said control signal generating means includes an absolute time code signal source for generating said absolute time code signal, means for receiving a clock signal with a frequency twice said first predetermined frequency, switching means receiving said clock signal at first and second inputs and producing an output by switching between said first and second inputs in accordance with said absolute time code signal, and filter means supplied with the output of said switching means and passing a frequency component including said first predetermined frequency, said filter means producing said modulated control signal as an output.

4. A method of forming a wobbling, substantially spiral pregroove on a disc-shaped recording medium for use as a guide when subsequently recording data on the recording medium, said method comprising the steps of:

rotating said disc-shaped recording medium;

radiating a laser beam;

guiding the laser beam to said disc-shaped recording medium and moving the laser beam radially on the rotating recording medium to form a substantially spiral pregroove, said guiding step including a step of deflecting the laser beam in a radial direction of said disc-shaped recording medium in response to a modulated control signal while said disc-shaped recording medium rotates and said laser light beam is moved radially on the rotating recording medium, whereby a wobbling, substantially spiral pregroove is formed on said disc-shaped recording medium;

generating said modulated signal by switching on and off a first signal that has a first predetermined frequency in accordance with a second signal that contains coded information and has a second predetermined frequency at least an order of magnitude lower than said first predetermined frequency; and controlling said deflecting of said laser beam in accordance with said modulated control signal for wobbling said laser beam while forming said spiral pregroove on said recording medium.

5. A method according to claim 4, wherein said generating step includes steps of code-modulating said first signal by said second signal to produce a code-modulated signal and filtering the code-modulated signal to produce said control signal.

6. A disc-shaped recording medium capable of having a data signal optically recorded thereon and optically reproduced therefrom, said recording medium comprising:

a substrate layer having first and second surfaces, said first surface having formed thereon a substantially spiral pregroove which is wobbled in a radial direction of said disc-shaped recording medium and formed by a control signal consisting of a first signal that has a predetermined frequency and that has been modulated by a second signal that contains coded information and that has a frequency at least an order of magnitude lower than said predetermined frequency;

a recording layer formed on the first surface of said substrate layer and adapted for subsequent optically recording the data signal thereon; and a protective layer formed on said recording layer.

* * * * *